United States Patent
Ito et al.

(10) Patent No.: US 12,261,545 B2
(45) Date of Patent: Mar. 25, 2025

(54) ELECTRIC COMPRESSOR WITH A BUSBAR THAT SUPPORTS THE CONTROL BOARD

(71) Applicant: SANDEN CORPORATION, Isesaki (JP)

(72) Inventors: Toru Ito, Isesaki (JP); Masayuki Shimoda, Isesaki (JP)

(73) Assignee: SANDEN CORPORATION, Isesaki (JP)

( * ) Notice: Subject to any disclaimer, the term of this patent is extended or adjusted under 35 U.S.C. 154(b) by 280 days.

(21) Appl. No.: 18/044,949

(22) PCT Filed: Aug. 26, 2021

(86) PCT No.: PCT/JP2021/031304
§ 371 (c)(1),
(2) Date: Mar. 10, 2023

(87) PCT Pub. No.: WO2022/059449
PCT Pub. Date: Mar. 24, 2022

(65) Prior Publication Data
US 2023/0353060 A1    Nov. 2, 2023

(30) Foreign Application Priority Data

Sep. 18, 2020   (JP) .................................. 2020-157668

(51) Int. Cl.
*H02M 7/5387*   (2007.01)
*F04B 35/04*    (2006.01)
*H02M 7/00*     (2006.01)

(52) U.S. Cl.
CPC ............. *H02M 7/003* (2013.01); *F04B 35/04* (2013.01); *H02M 7/5387* (2013.01)

(58) Field of Classification Search
CPC ...... H02M 7/003; H02M 7/5387; F04B 35/04
See application file for complete search history.

(56) References Cited

U.S. PATENT DOCUMENTS

2013/0277820 A1   10/2013   Hotta et al.
2014/0117526 A1   5/2014    Nishiuchi et al.
(Continued)

FOREIGN PATENT DOCUMENTS

DE   102019107675 A1 * 10/2019 ............. F04B 35/04
JP   2012-147596 A    8/2012
(Continued)

OTHER PUBLICATIONS

Japan Patent Office, International Search Report issued in International Patent Application No. PCT/JP2021/031304, mailed Oct. 26, 2021.
(Continued)

*Primary Examiner* — Harry R Behm
(74) *Attorney, Agent, or Firm* — Baker Botts L.L.P.

(57) ABSTRACT

Provided is an electric compressor that can ensure necessary stiffness for stacked members including a supporting plate and a control board, without increasing the number of components. An inverter circuit portion of an inverter-equipped electric compressor includes busbars 6a (61, 62, and 63) that are each formed by a thin plate member made of metal and that each constitutes part of the wiring of the inverter circuit portion, and includes a plate-like supporting plate 6b that is formed by a resin member molded integrally with the busbars 6a. Each of the busbars 6a (61, 62, and 63) has an embedded portion (a U-phase embedded portion 611, a V-phase embedded portion 621, or a W-phase embedded portion 631) that is embedded in the supporting plate 6b. Each of the embedded portions (the U-phase embedded portion 611, the V-phase embedded portion 621, and the W-phase embedded portion 631) extends in a direction perpendicular to the thickness direction of the supporting plate 6b, and the thickness direction of the thin plate member of each embedded portion (the U-phase embedded portion (Continued)

611, the V-phase embedded portion 621, and the W-phase embedded portion 631) is perpendicular to the thickness direction of the supporting plate 6*b*.

10 Claims, 12 Drawing Sheets

(56) References Cited

U.S. PATENT DOCUMENTS

| | | | |
|---|---|---|---|
| 2016/0126802 A1 | 5/2016 | Nagao et al. | |
| 2019/0067167 A1* | 2/2019 | Hong | ............... H01L 25/18 |
| 2020/0390000 A1 | 12/2020 | Sasaki et al. | |

FOREIGN PATENT DOCUMENTS

| | | | | |
|---|---|---|---|---|
| JP | 2014-113025 A | 6/2014 | | |
| JP | 2016-092932 A | 5/2016 | | |
| JP | 2017-172509 A | 9/2017 | | |
| JP | 2018/131336 A1 | 7/2018 | | |
| WO | WO-2018230030 A1 * | 12/2018 | ............. | G01R 15/20 |
| WO | 2019/098088 A1 | 5/2019 | | |

OTHER PUBLICATIONS

Japan Patent Office, Notice of Reasons for Refusal issued in Japanese Patent Application No. 2020-157668, dated Jul. 9, 2024 (4 pages).

\* cited by examiner

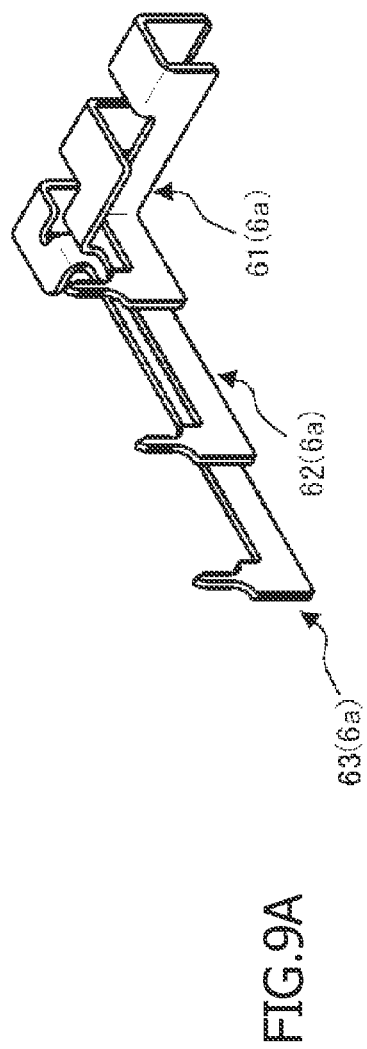
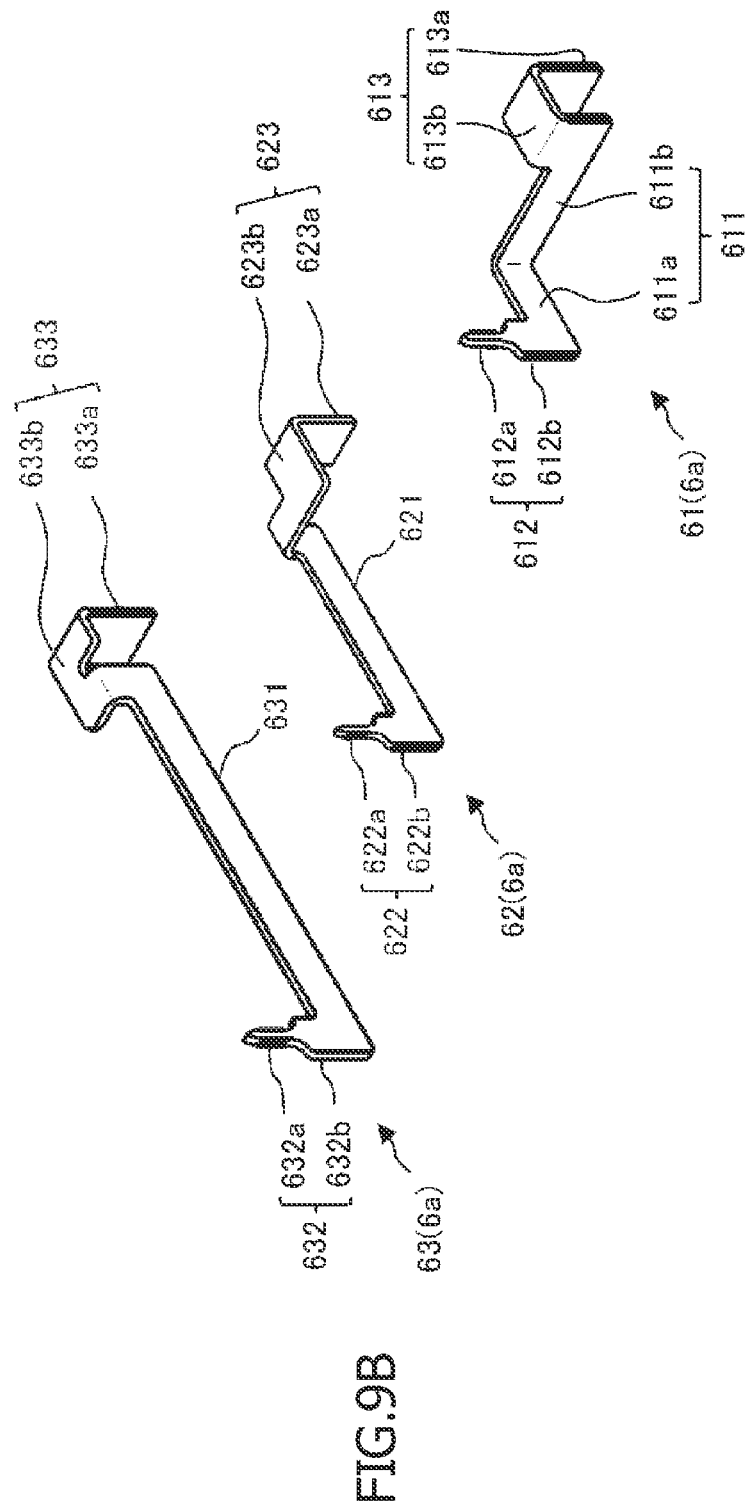
FIG.9A
FIG.9B

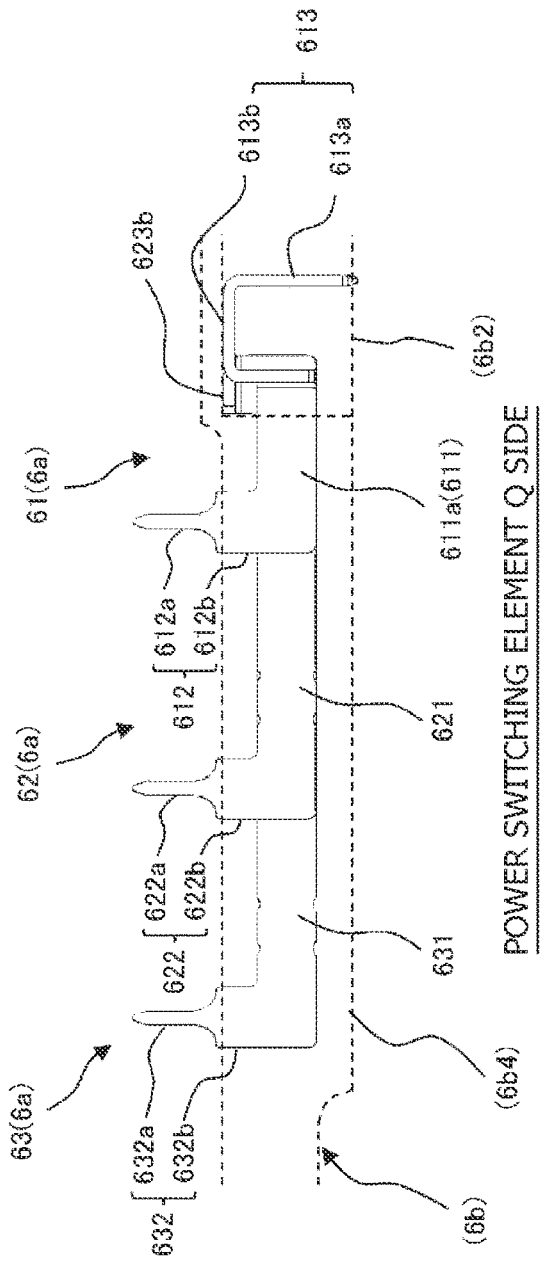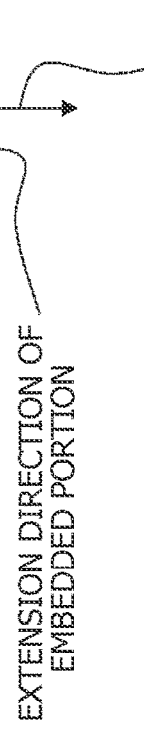
FIG.12

ELECTRIC COMPRESSOR WITH A BUSBAR THAT SUPPORTS THE CONTROL BOARD

CROSS-REFERENCE TO RELATED APPLICATIONS

This application is a U.S. National Stage patent application under 37 U.S.C. § 371 of International Patent Application No. PCT/JP2021/031304, filed on Aug. 26, 2021, which claims the benefit of Japanese Patent Application No. JP 2020-157668, filed on Sep. 18, 2020, the disclosures of each of which are incorporated herein by reference in their entirety.

TECHNICAL FIELD

The present invention relates to an electric compressor that is used for compressing refrigerant, for example, in an air conditioner for a vehicle, and that integrally includes an inverter circuit portion (to an inverter-equipped electric compressor).

BACKGROUND ART

For example, as this kind of electric compressor, the electric compressor described in Patent Document 1 is known. The electric compressor described in Patent Document 1 includes an inverter circuit portion for supplying three-phase alternating current (AC) power to a motor. This inverter circuit portion includes a high heat dissipation board on which a plurality of power switching elements are mounted, a control board which is disposed above the high heat dissipation board and on which a control circuit is mounted, and a busbar assembly disposed between the high heat dissipation board and the control board. The busbar assembly includes a plurality of busbars constituting part of the wiring of the inverter circuit portion, a plurality of dummy busbars for maintaining the gap between the control board and the busbar assembly, and a resin plate molded integrally with the busbars and the dummy busbars (this resin plate will hereinafter be referred to as a supporting plate). Each busbar is formed to protrude toward the control board at an outer edge portion of the supporting plate, and each dummy busbar is formed to protrude toward the control board at the center portion of the supporting plate. The control board has a cut portion at a location corresponding to the busbars, that is, the busbars are not covered by the control board. In contrast, the control board is located over the dummy busbars, and an end portion of each dummy busbar is connected to the control board. Because each dummy busbar of the busbar assembly is connected to the control board as described above, the gap between the busbar assembly and the control board is suitably maintained. In addition, necessary stiffness can be ensured for the stacked members including the supporting plate and the control board, the stacked members constituting a main structure of the inverter circuit portion. Each dummy busbar does not function as part of the wiring of the inverter circuit portion, but does function to maintain the gap between the control board and the busbar assembly and does function as a dedicated reinforcement member.

REFERENCE DOCUMENT LIST

Patent Document

Patent Document 1: JP 2017-172509 A

SUMMARY OF THE INVENTION

Problem to be Solved by the Invention

However, the electric compressor described in Patent Document 1 needs the dedicated members (that is, the plurality of dummy busbars) to ensure the necessary stiffness for the stacked members including the supporting plate and the control board. That is, the electric compressor needs more components, for example. Thus, a technique that can ensure the necessary stiffness without increasing the number of components is demanded.

In view of these circumstances, an object of the present invention is to provide an electric compressor that can ensure necessary stiffness for stacked members including a supporting plate and a control board, without increasing the number of components.

Means for Solving the Problem

According to an aspect of the present invention, there is provided an electric compressor including: an inverter circuit portion having a plurality of power switching elements; and a control board disposed above the plurality of power switching elements. The inverter circuit portion of the electric compressor includes a busbar and a supporting plate. The busbar is formed by a thin plate member made of metal and constitutes part of a wiring of the inverter circuit portion. The supporting plate is formed by a resin member molded integrally with the busbar, is disposed between the plurality of power switching elements and the control board, and supports the control board from below. The busbar has an embedded portion that is embedded in the supporting plate. This embedded portion extends in a direction perpendicular to the thickness direction of the supporting plate, and the thickness direction of the thin plate member of the embedded portion is perpendicular to the thickness direction of the supporting plate.

Effects of the Invention

In the electric compressor, the embedded portion of the busbar formed by a thin plate member made of metal extends in a direction perpendicular to the thickness direction of the supporting plate, and the thickness direction of the thin plate member of the embedded portion is perpendicular to the thickness direction of the supporting plate. Because the embedded portion of the busbar is embedded in the supporting plate in this orientation (posture) the thickness direction of the supporting plate (in other words, the control board) in which the supporting plate and the control board easily warp matches the width direction of the thin plate member of the embedded portion. As a result, because the embedded portion has a sufficient size in its height direction in the supporting plate (in the thickness direction of the supporting plate), the stiffness of the supporting plate molded integrally with the busbar can be improved by the embedded portion of the busbar. By disposing the embedded portion, which functions as part of the wiring of the inverter circuit portion, in the supporting plate as described above, the stiffness of the supporting plate can be improved. As a result, the necessary stiffness for the stacked members including the supporting plate and the control board can be ensured, without increasing the number of components.

As described above, it is possible to provide an electric compressor that can ensure necessary stiffness for stacked members including a supporting plate and a control board, without increasing the number of components.

BRIEF DESCRIPTION OF THE DRAWINGS

FIG. 9A is a perspective view of a plurality of busbars of the busbar assembly.

FIG. 9B is a perspective view of a plurality of busbars of the busbar assembly.

FIG. 12 is a conceptual diagram illustrating the embedded state of embedded portions of the busbars.

MODE FOR CARRYING OUT THE INVENTION

Figure 1:
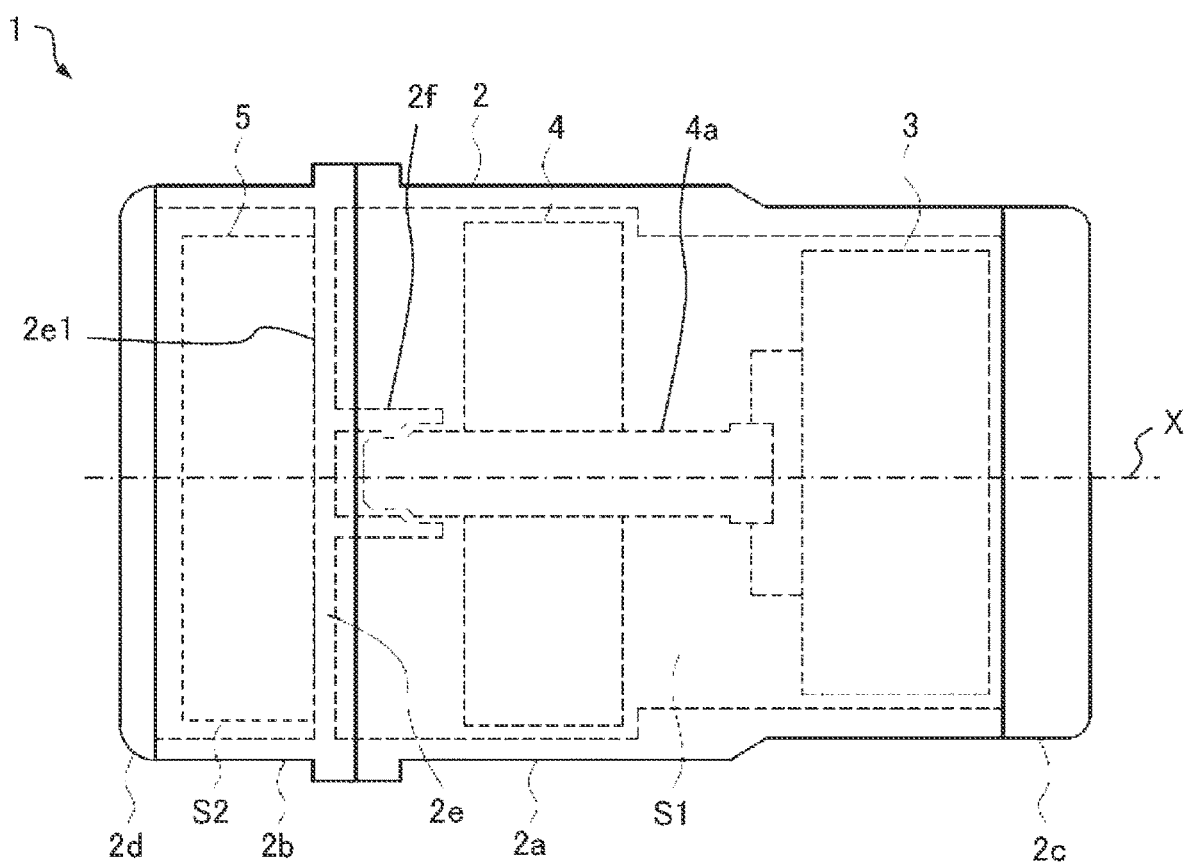
FIG. 1 schematically illustrates the exterior of an electric compressor according to an example of the present invention.

Hereinafter, an example of the present invention will be described with reference to the accompanying drawings. FIG. 1 schematically illustrates the exterior of an electric compressor according to an example of the present invention. An electric compressor 1 according to the present example is, for example, a so-called inverter-equipped electric compressor incorporated in a refrigerant circuit of an air conditioner for a vehicle. This electric compressor 1 is formed to draw refrigerant and to compress and discharge the drawn refrigerant.

The electric compressor 1 includes a housing 2, a compression mechanism 3 that compresses the refrigerant, a motor 4 that drives the compression mechanism 3, and an inverter circuit portion 5 that supplies power to the motor 4.

The housing 2 stores therein the compression mechanism 3, the motor 4, and the inverter circuit portion 5, and is formed by a main housing 2a, an inverter housing 2b, and two cover members 2c and 2d. These components (2a to 2d) are integrally fastened to each other by bolts, for example.

The compression mechanism 3 and the motor 4 are stored in the main housing 2a, and the inverter circuit portion 5 is stored in the inverter housing 2b. The main housing 2a has an approximately cylindrical shape. An opening portion located at one end of the main housing 2a is closed by the cover member 2c, and an opening portion located at the other end of the main housing 2a is closed by the inverter housing 2b. The inverter housing 2b has a box-like shape that is open in the direction opposite to the main housing 2a. This opening portion is closed by the cover member 2d. As will be described with reference to FIG. 3, in a plan view seen from this opening portion, the inverter housing 2b has an arc-like first peripheral wall portion 2b1 having an outline matching the cylindrical peripheral wall of the main housing 2a and a second peripheral wall portion 2b2 formed to protrude to the outside more than the outer surface of the peripheral wall of the main housing 2a. FIG. 1 illustrates the electric compressor 1 in a direction such that only the first peripheral wall portion 2b1 is seen. The second peripheral wall portion 2b2 is hidden behind the electric compressor 1 in FIG. 1.

The inverter housing 2b has a compartment wall portion 2e, which is the bottom wall of the inverter housing 2b. The area in the housing 2 is divided by the compartment wall portion 2e into a first space S1 including the compression mechanism 3 and the motor 4 and into a second space S2 including the inverter circuit portion 5. In addition, the compartment wall portion 2e has a cylindrical supporting portion 2f that rotatably supports one end portion of a driving shaft 4a of the motor 4. The inverter circuit portion 5 is attached to a wall surface 2e1 of the compartment wall portion 2e of the housing 2 in the second space. That is, the housing 2 has the wall surface 2e1 to which the inverter circuit portion 5 is attached. Although not shown, a refrigerant intake port is formed in the peripheral wall of the main housing 2a, and the refrigerant that has flowed into the first space S1 through the intake port flows around the motor 4, etc., and is drawn into the compression mechanism 3. Thus, the compartment wall portion 2e, the main housing 2a, and the motor 4 are cooled by the refrigerant. Next, the refrigerant compressed by the compression mechanism 3 is discharged from a discharge port (not shown).

The power from the inverter circuit portion 5 is supplied to the motor 4 via output terminals 8 to be described below (see FIG. 3), sealed terminals 9 to be described below connected to the output terminals 8 (see FIGS. 3, 6, and 7), and lead wires (not shown) connected to the sealed terminals 9. The sealed terminals 9 run through the compartment wall portion 2e.

Figure 2:
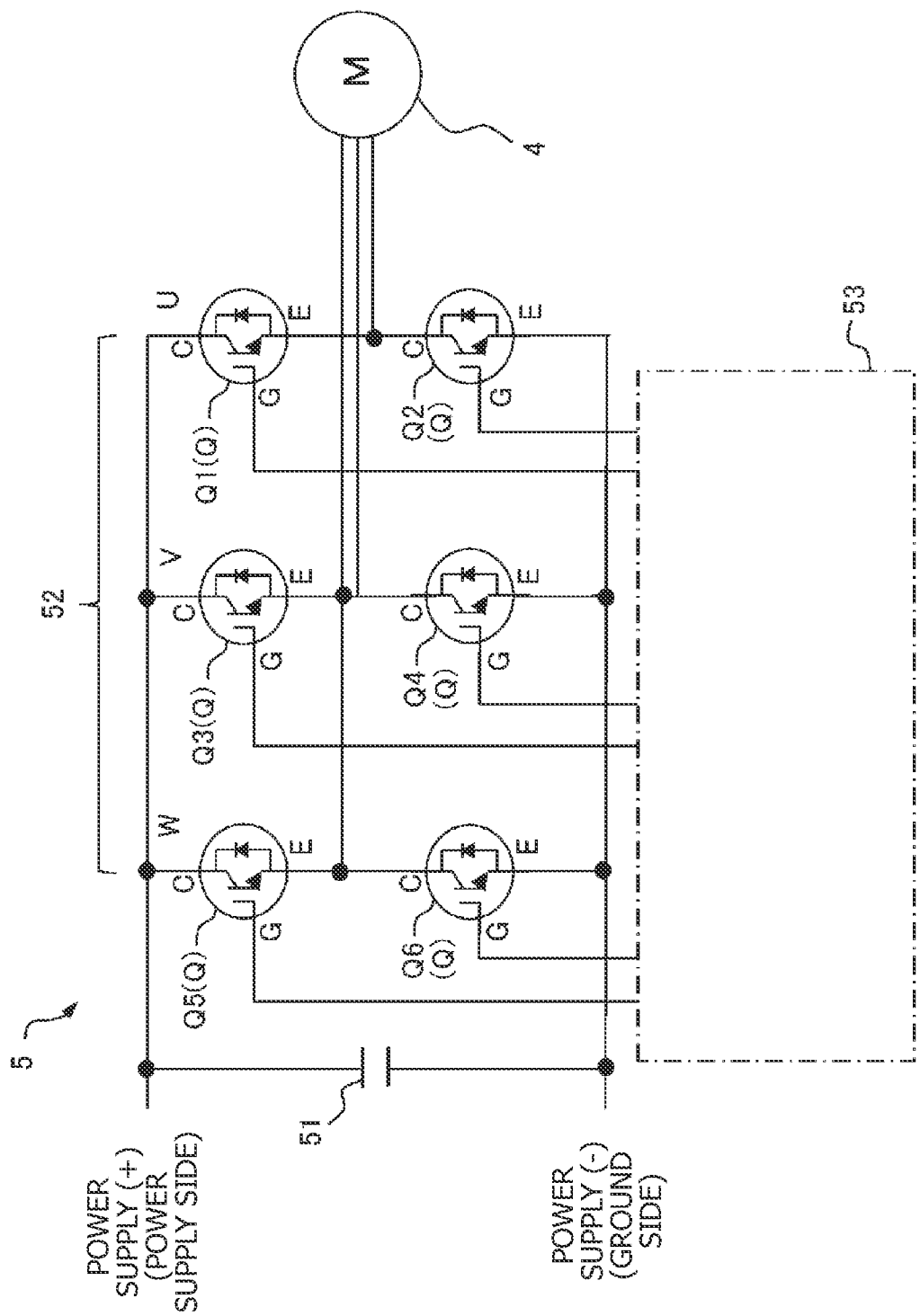
FIG. 2 illustrates an example of a schematic circuit diagram of the electric compressor.

Next, a schematic structure of a circuit including the inverter circuit portion 5 will be described. FIG. 2 schematically illustrates a circuit including the inverter circuit portion 5 according to the present example.

The inverter circuit portion 5 converts a direct-current (DC) power from an external power supply such as a battery (not shown) into three-phase AC power and supplies this three-phase AC power to the motor 4. The inverter circuit portion 5 includes, as its circuit configuration, a smoothing capacitor 51, a power switching element group 52, and a power switching element group control circuit 53, for example.

The power switching element group 52 is formed by a plurality of power switching elements Q (six power switching elements Q in FIG. 2). These power switching elements Q are each an insulated gate bipolar transistor (IGBT). That is, the inverter circuit portion 5 includes a plurality of power switching elements Q. Hereinafter, the individual power switching element Q will simply be referred to as element Q, as needed. When these elements Q need to be distinguished from one another, these elements Q will be described by using reference numerals Q1 to Q6.

The power switching element group 52 will be described in more detail. Based on PWM control (control for generating a voltage of which pulse width has been modulated at a constant period to obtain a quasi sine wave), the power switching element group 52 converts a DC voltage from the capacitor 51 into an AC voltage and supplies the AC voltage to the motor 4. In addition, the power switching element group 52 includes a U-phase arm, a V-phase arm, and a W-phase arm in parallel between the power supply side line and the ground side line of the capacitor 51.

The U-phase arm includes two elements (Q1 and Q2) connected in series between the power supply side line and the ground side line of the capacitor 51. The V-phase arm includes two elements (Q3 and Q4) connected in series between the power supply side line and the ground side line of the capacitor 51. The W-phase arm includes two elements (Q5 and Q6) connected in series between the power supply side line and the ground side line of the capacitor 51.

An intermediate point of each of the U, V, and W-phase arms is connected to a corresponding U, V, or W-phase coil of the motor 4. That is, an intermediate point of a wiring connecting the two elements (Q1 and Q2) is connected to the U-phase coil of the motor 4, an intermediate point of a wiring connecting the two elements (Q3 and Q4) is connected to the V-phase coil of the motor 4, and an intermediate point of a wiring connecting the two elements (Q5 and Q6) is connected to the W-phase coil of the motor 4.

In the present example, the elements (Q1, Q3, and Q5) correspond to "power-supply-side elements" according to the present invention, and the elements (Q2, Q4, and Q6) correspond to "ground-side elements" according to the present invention. In addition, the pair of elements (Q1 and Q2), the pair of elements (Q3 and Q4), and the pair of elements (Q5 and Q6) each correspond to "one pair of power switching elements of the same phase" according to the present invention.

The power switching element group control circuit 53 controls the elements (Q1 to Q6) to drive the motor 4 based on a control signal from an external air conditioner control apparatus for a vehicle. The power switching element group control circuit 53 includes, for example, a microcomputer unit and a plurality of drive control elements that directly control driving of the elements (Q1 to Q6). The microcomputer unit controls driving of the drive control elements by outputting a control signal to the drive control elements based on, for example, a control signal from the air conditioner control apparatus for a vehicle. The plurality of drive control elements are each driven based on the control signal from the microcomputer unit and directly control the driving of the control target elements Q (the elements Q1 to Q6). Each of the drive control elements is connected, for example, to the gate terminal G and the emitter terminal E of a corresponding one of the control target elements Q.

The inverter circuit portion 5 includes a busbar assembly 6 and a control board 7, and these components (6 and 7) constitute a main structure of the inverter circuit portion 5.

Figure 3:
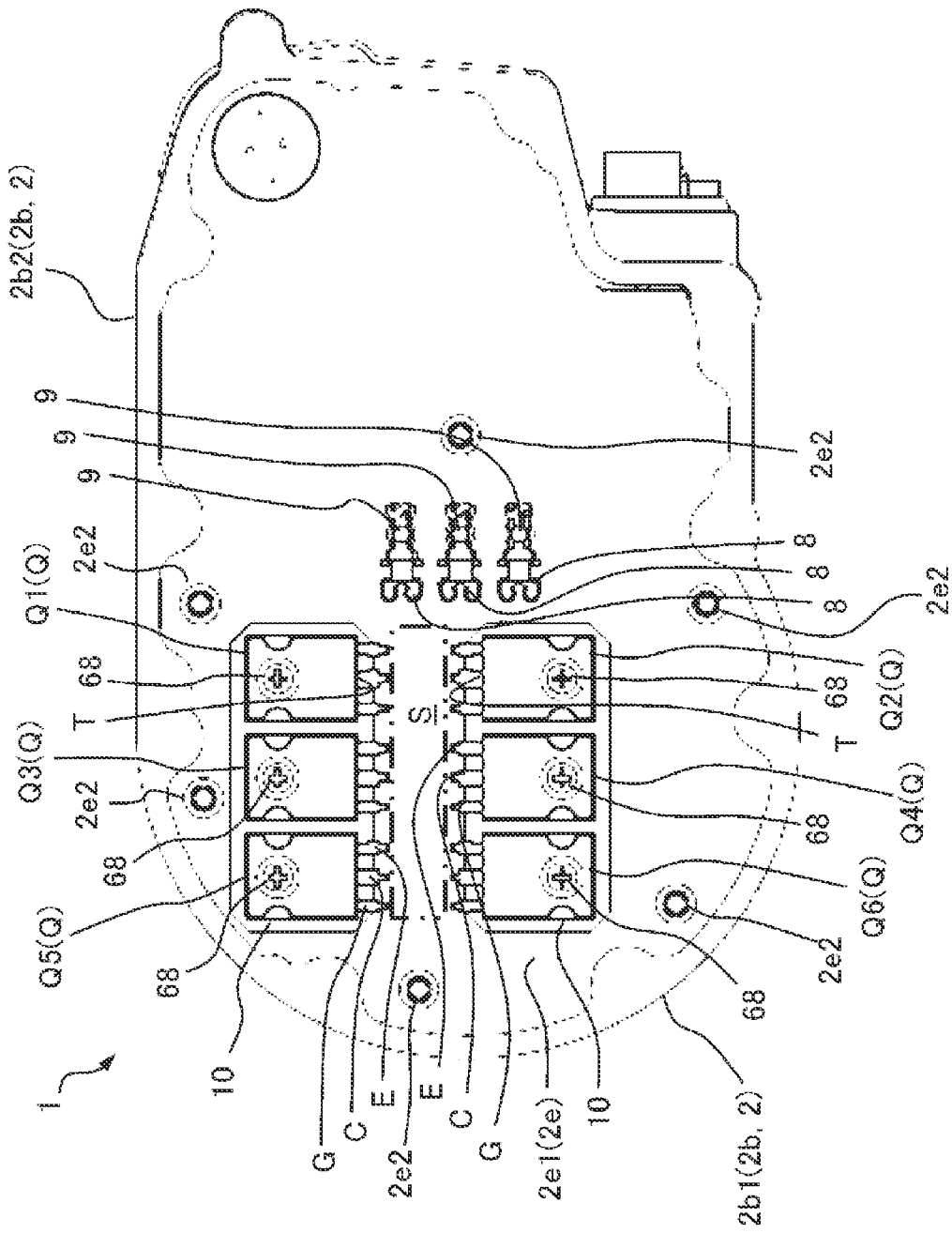
FIG. 3 illustrates power switching elements of the electric compressor that are attached to a wall surface of a housing.
Figure 4:
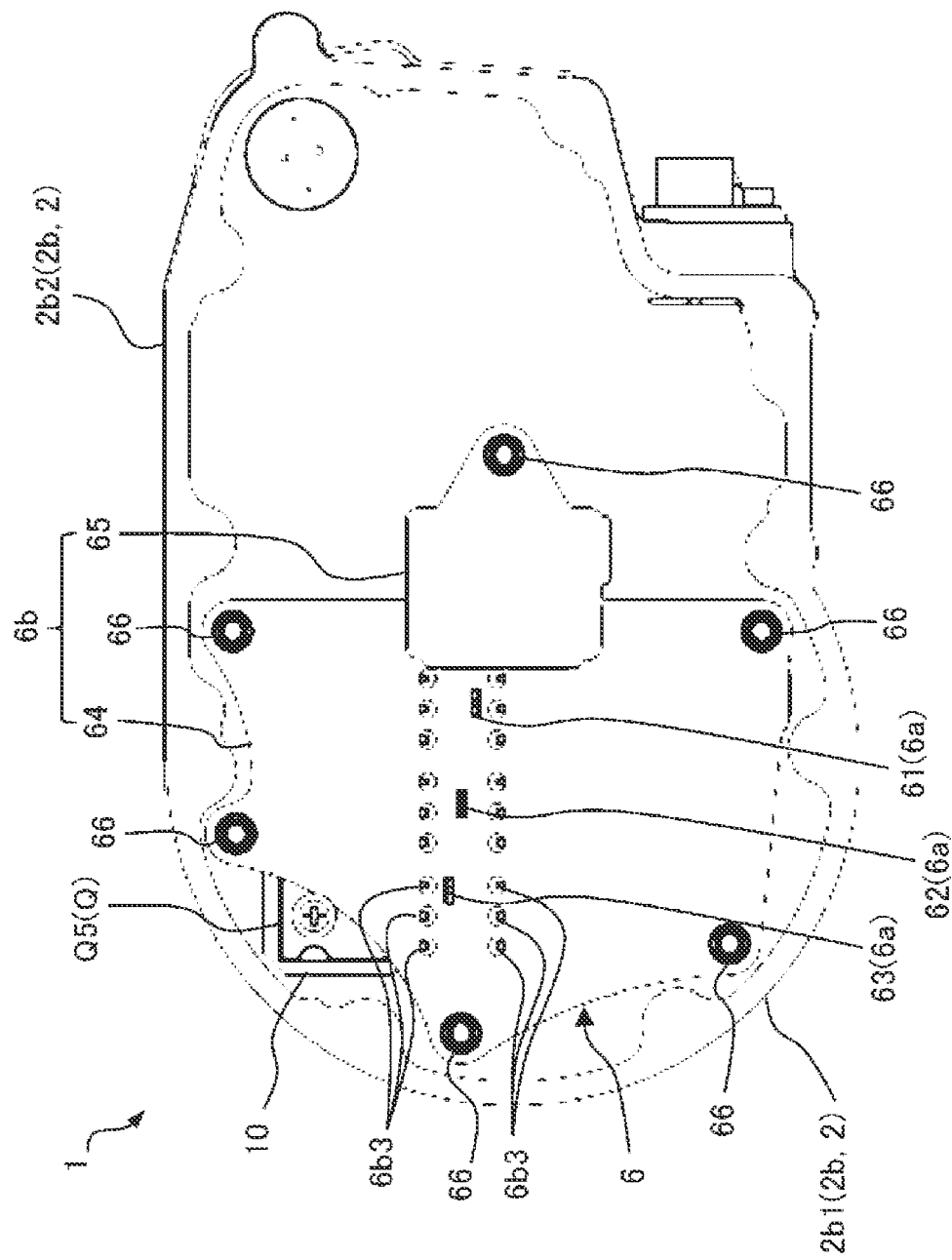
FIG. 4 illustrates a busbar assembly attached to the power switching elements in FIG. 3.
Figure 5:
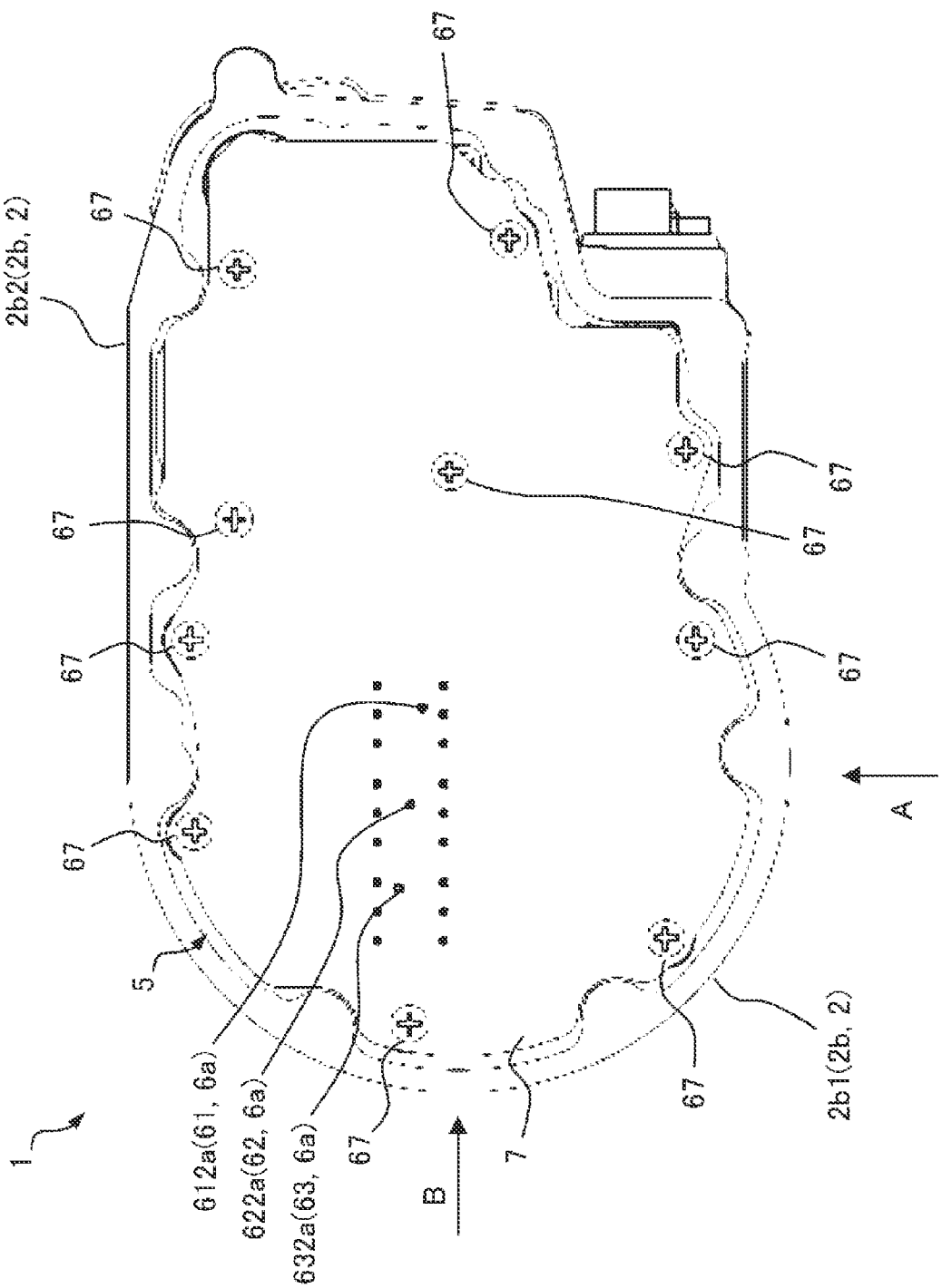
FIG. 5 illustrates a control board attached to the busbar assembly in FIG. 4.
Figure 6:
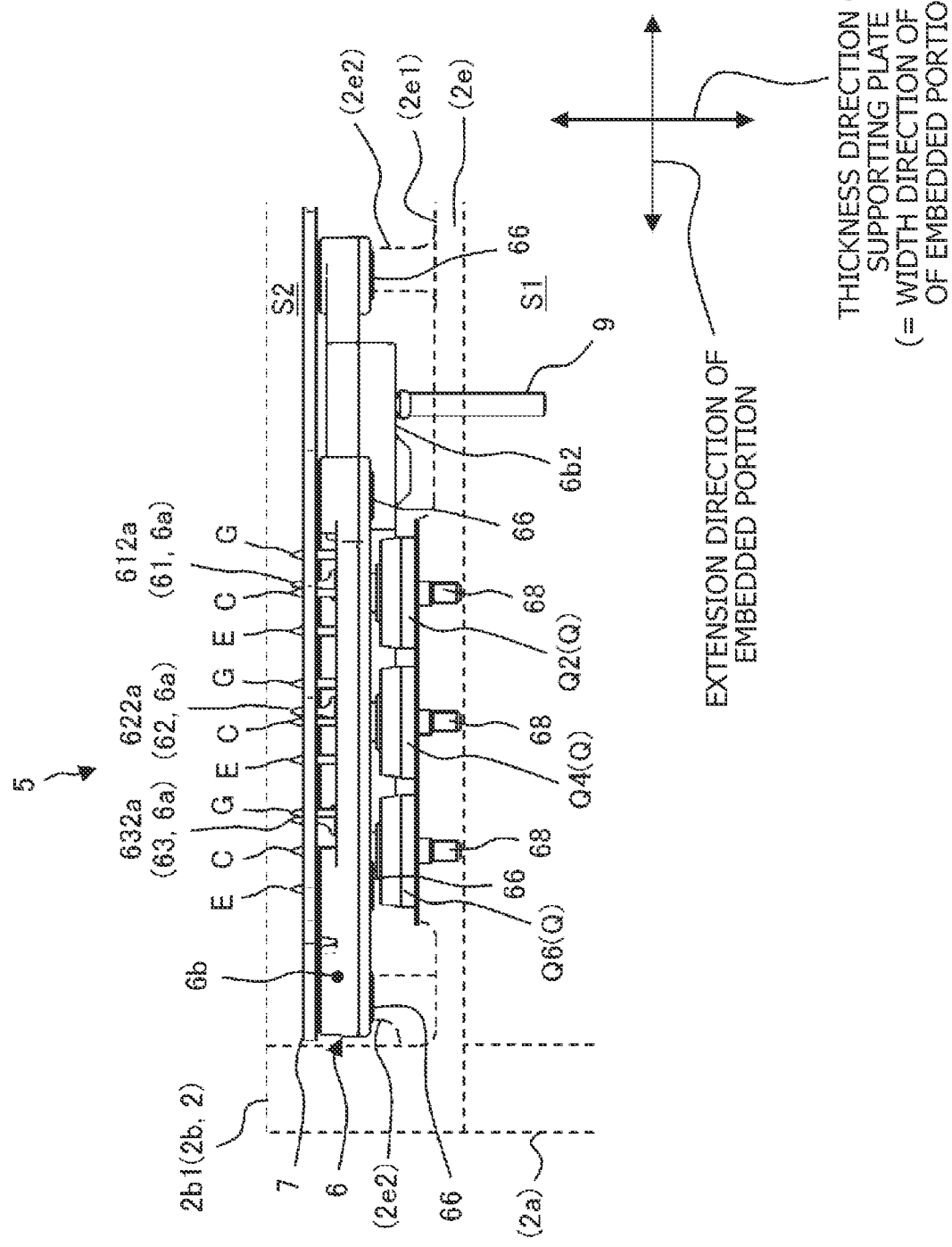
FIG. 6 is a side view of a main portion of an inverter circuit portion seen from a direction A illustrated in FIG. 5.
Figure 7:
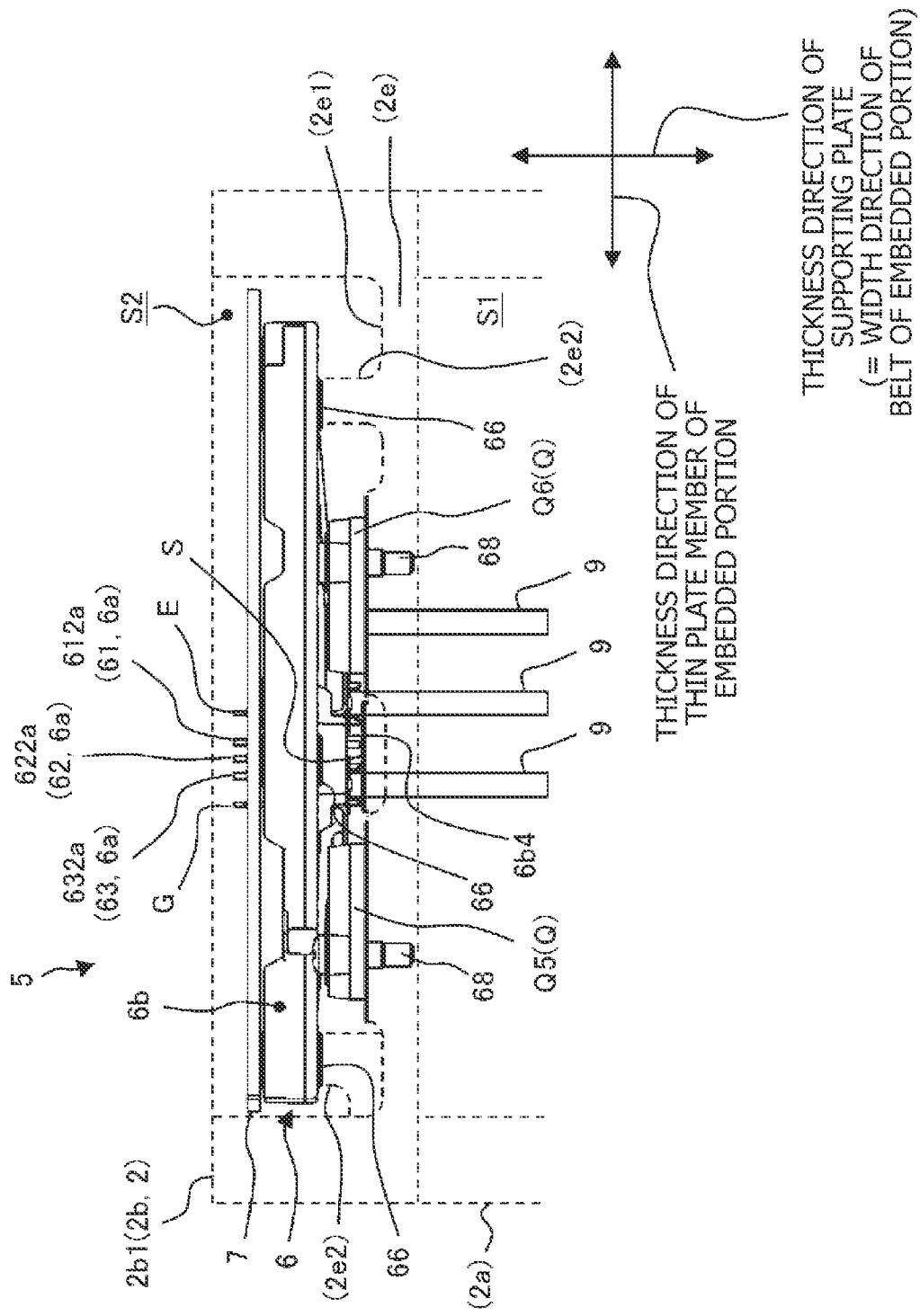
FIG. 7 is a side view of the main portion of the inverter circuit portion seen from a direction B illustrated in FIG. 5.

FIG. 3 illustrates the plurality of elements Q attached to the wall surface 2e1 of the compartment wall portion 2e in the inverter housing 2b. FIG. 4 illustrates the busbar assembly 6 attached to the plurality of elements Q in FIG. 3. FIG. 5 illustrates the control board 7 attached to the busbar assembly 6 in FIG. 4. FIG. 6 is a side view schematically illustrating a main portion of the inverter circuit portion 5 seen from a direction A illustrated in FIG. 5. FIG. 7 is a side view schematically illustrating the main portion of the inverter circuit portion 5 seen from a direction B illustrated in FIG. 5.

Specifically, the plurality of elements Q, the busbar assembly 6, and the control board 7 of the inverter circuit portion 5 are disposed in this order (Q, 6, 7) from the compartment wall portion 2e. Each element Q is disposed on the wall surface 2e1 (specifically, on an insulating sheet 10, which will be described below) of the compartment wall portion 2e in the second space S2 (see FIGS. 3, 6, and 7). The busbar assembly 6 is disposed above the plurality of elements Q (see FIGS. 4, 6, and 7), and the control board 7 is disposed over the busbar assembly 6 (in other words, the plurality of elements Q) (see FIGS. 5 to 7). In this way, the inverter circuit portion 5 has a stacked structure formed by the plurality of elements Q, the busbar assembly 6, and the control board 7.

Figure 8:
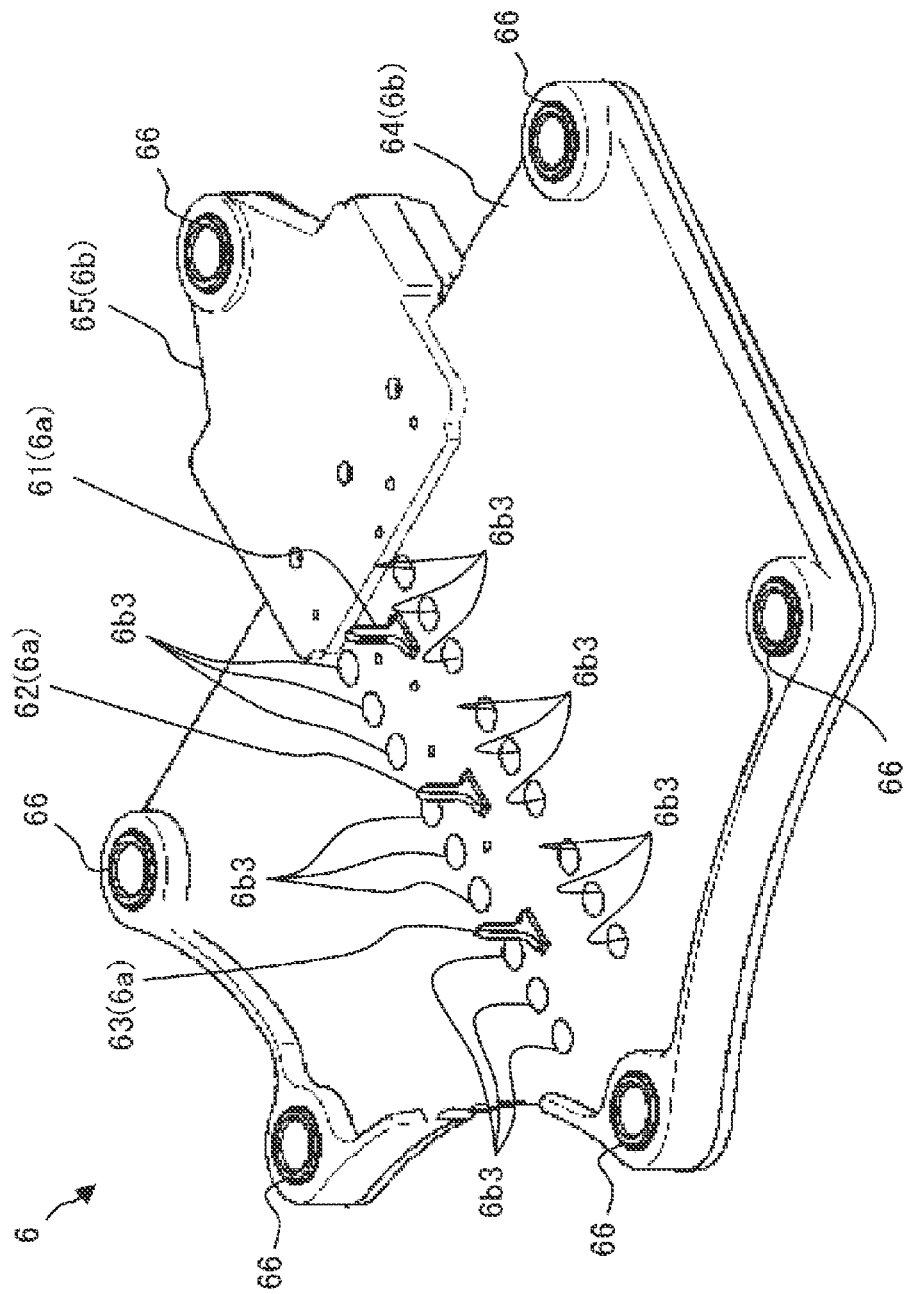
FIG. 8 is a perspective view of the busbar assembly.
Figure 10:
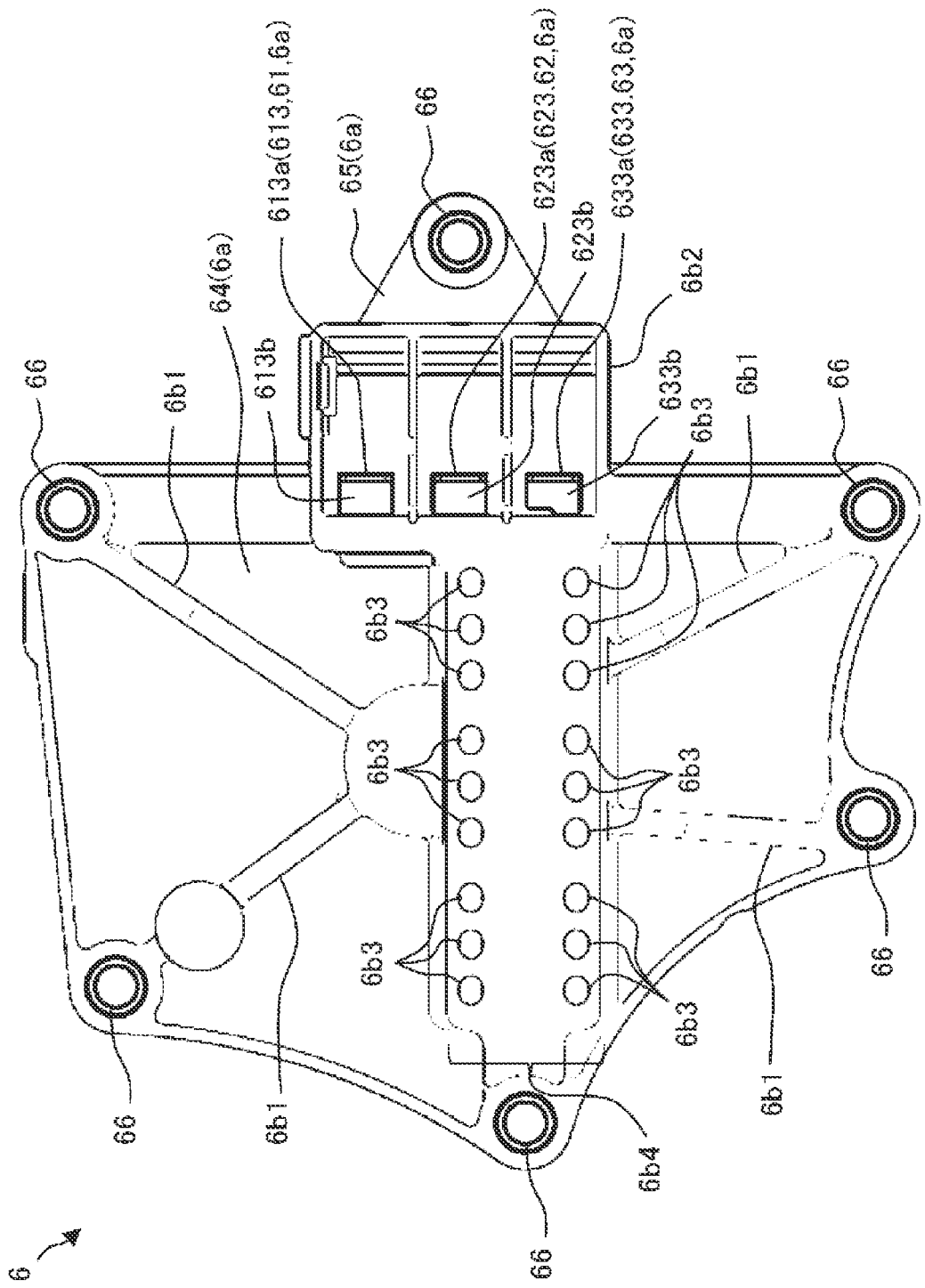
FIG. 10 is a bottom view of the busbar assembly.

FIGS. 8 to 10 illustrate the structure of the busbar assembly 6. FIG. 8 is a perspective view of the busbar assembly 6. FIGS. 9A and 9B are perspective views of a plurality of busbars 6a, which will be described below, of the busbar assembly 6. FIG. 10 is a bottom view of the busbar assembly 6.

The busbar assembly 6 includes busbars 6a, each of which is formed as appropriate and constitutes part of the wiring inside the inverter circuit portion 5, and a plate-like supporting plate 6b molded integrally with the busbars 6a and made of resin material (see FIG. 8). In other words, the busbar assembly 6 is a product formed by the busbars 6a and the supporting plate 6b that are integrated with each other by insert molding.

The busbars 6a are each a thin plate member made of electrically conductive metal having a predetermined thickness. In the present example, the busbar assembly 6 (the inverter circuit portion 5) includes a plurality of busbars 6a (three busbars 6a) (see FIGS. 8 and 9). Each busbar 6a is mostly embedded in the supporting plate 6b. FIG. 9A is a perspective view of the busbars 6a and illustrates the positions of the busbars 6a embedded in the supporting plate 6b. In FIG. 9B, the busbars 6a are illustrated separately from each other so as to clarify each busbar 6a.

In the present example, each busbar 6a constitutes part of the wiring for suppling power to the motor 4. Specifically, each busbar 6a constitutes part of the wiring between an intermediate point (see FIG. 2) of a wiring connecting one pair of elements Q of the same phase (specifically, (Q1 and Q2), (Q3 and Q4), or (Q5 and Q6)) and the motor 4 to which the power is supplied. Hereinafter, when the three busbars 6a are distinguished from one another, the busbar 6a for the elements (Q1 and Q2) will be referred to as a U-phase busbar 61, the busbar 6a for the elements (Q3 and Q4) will be referred to as a V-phase busbar 62, and the busbar 6a for the elements (Q5 and Q6) will be referred to as a W-phase busbar 63.

Specifically, the U-phase busbar 61 constitutes part of the wiring between an intermediate point of the pair of elements (Q1 and Q2) of the U-phase arm and a U-phase output terminal 8 (see FIG. 3) of the three-phase AC power. The V-phase busbar 62 constitutes part of the wiring between an intermediate point of the pair of elements (Q3 and Q4) of the V-phase arm and a V-phase output terminal 8. The W-phase busbar 63 constitutes part of the wiring between an intermediate point of the pair of elements (Q5 and Q6) of the W-phase arm and a W-phase output terminal 8.

The U-phase busbar 61, the V-phase busbar 62, and the W-phase busbar 63 are disposed close to each other side by side (see FIG. 9A) and are mostly embedded in the supporting plate 6b (see FIG. 8). For example, the individual busbars 6a (61, 62, and 63) are disposed such that the V-phase busbar 62 is located between the U-phase busbar 61 and the W-phase busbar 63.

The individual busbars 6a (61, 62, and 63) are each formed by performing punching, hole drilling, bending, etc., on a thin plate member made of metal. As illustrated in FIGS. 9A and 9B, each busbar 6a has the thickness of the corresponding thin plate member and has a plurality of bent portions.

Specifically, the U-phase busbar 61 is formed by a belt-like U-phase embedded portion 611 having a predetermined width and embedded in the supporting plate 6b, a U-phase first connection portion 612 located at one end portion of the U-phase embedded portion 611 in the longitudinal direction of the U-phase embedded portion 611 and constituting an end connected to the corresponding elements Q in the corresponding wiring path, and a U-phase second connection portion 613 located at the other end portion of the U-phase embedded portion 611 in the longitudinal direction of the U-phase embedded portion 611 and constituting an end connected to the corresponding output terminal 8 in the corresponding wiring path.

The U-phase embedded portion 611 is bent at a right angle at its approximately center portion in the longitudinal direction of the U-phase embedded portion 611. The U-phase embedded portion 611 is bent in an approximately L shape when seen directly from one end surface in the width direction of the belt of the belt-like U-phase embedded portion 611 (that is, in a direction perpendicular to the longitudinal direction of the U-phase embedded portion 611 and perpendicular to the thickness direction of the thin plate member of the busbar 6a). The U-phase embedded portion 611 is formed by a U-phase first embedded portion 611a corresponding to one end portion in the longitudinal direction of the U-phase embedded portion 611 (the portion being connected to the U-phase first connection portion 612) and a U-phase second embedded portion 611b corresponding to the other end portion of the U-phase embedded portion 611 in the longitudinal direction of the U-phase embedded portion 611 (the portion being connected to the U-phase second connection portion 613).

The U-phase first connection portion 612 protrudes outwardly in the width direction (upward in FIG. 9B) from the one end portion of the U-phase embedded portion 611 in the longitudinal direction of the U-phase embedded portion 611 on one end surface of the U-phase embedded portion 611 in the width direction of the U-phase embedded portion 611 (the upper end surface in FIG. 9B). Specifically, the U-phase first connection portion 612 is formed by a long and thin U-phase first connection part 612a, which is an end directly connected to the corresponding elements Q, has an approximately prismatic cross section, and extends upward, and by a U-phase first base end part 612b, which is connected to the U-phase embedded portion 611 and has approximately the same width as that of the U-phase embedded portion 611.

The U-phase second connection portion 613 has approximately the same width as that of the U-phase embedded portion 611. In addition, the U-phase second connection portion 613 is formed by a U-phase second connection part 613a and a U-phase intermediate part 613b and is located on one surface of the U-phase second embedded portion 611b in the thickness direction of the thin plate member (specifically, on a surface opposite to the U-phase second embedded portion 611b). The U-phase second connection part 613a is an end directly connected to the corresponding output terminal 8 and has a surface that faces one surface of the U-phase second embedded portion 611b in the thickness direction of the thin plate member. In addition, a screw hole is formed in the U-phase second connection part 613a. The U-phase intermediate part 613b connects the U-phase second connection part 613a and the other end portion (the U-phase second embedded portion 611b) of the U-phase embedded portion 611 in the longitudinal direction of the U-phase embedded portion 611. The U-phase intermediate part 613b extends to protrude in a direction opposite to the U-phase first embedded portion 611a from the other end portion of the U-phase embedded portion 611 in the longitudinal direction of the U-phase embedded portion 611 on one end surface of the U-phase embedded portion 611 in the width direction of the U-phase embedded portion 611 (the upper end surface in FIG. 9B) (specifically, the U-phase intermediate part 613b extends perpendicularly to the U-phase second embedded portion 611b).

The V-phase busbar 62 is formed by a belt-like V-phase embedded portion 621 having approximately the same width as that of the U-phase embedded portion 611 and embedded in the supporting plate 6b, a V-phase first connection portion 622 located at one end portion of the V-phase embedded portion 621 in the longitudinal direction of the V-phase embedded portion 621 and constituting an end connected to the corresponding elements Q in the corresponding wiring path, and a V-phase second connection portion 623 located at the other end portion of the V-phase embedded portion 621 in the longitudinal direction of the V-phase embedded portion 621 and constituting an end connected to the corresponding output terminal 8 in the corresponding wiring path.

The V-phase embedded portion 621 linearly extends in one direction. When embedded in the supporting plate 6b, the V-phase embedded portion 621 faces one surface of the U-phase first embedded portion 611a in the thickness direction of the thin plate member (specifically, a surface located opposite to the U-phase second connection portion 613) and extends in parallel to the U-phase first embedded portion 611a. In addition, the V-phase embedded portion 621 is longer than the U-phase first embedded portion 611a of the U-phase embedded portion 611 in the longitudinal direction of the V-phase embedded portion 621.

The V-phase first connection portion 622 protrudes outwardly (upward in FIG. 9B) in the width direction from the one end portion of the V-phase embedded portion 621 in the longitudinal direction of the V-phase embedded portion 621 on one end surface of the V-phase embedded portion 621 in the width direction of the V-phase embedded portion 621 (the upper end surface in FIG. 9B). Specifically, the V-phase first connection portion 622 is formed by a long and thin V-phase first connection part 622a, which is an end directly connected to the corresponding elements Q, has an approximately prismatic cross section, and extends upward, and by a V-phase first base end part 622b, which is connected to the V-phase embedded portion 621 and has approximately the same width as that of the V-phase embedded portion 621.

The V-phase second connection portion 623 has approximately the same width as that of the U-phase embedded portion 611. In addition, the V-phase second connection portion 623 is formed by a V-phase second connection part 623a and a V-phase intermediate part 623b and is located on one surface of the V-phase embedded portion 621 in the thickness direction of the thin plate member (specifically, near a surface near the U-phase busbar 61). The V-phase second connection part 623a constitutes an end directly connected to the corresponding output terminal 8 and has surfaces parallel to an end surface of the other end portion of the V-phase embedded portion 621 in the longitudinal direction of the V-phase embedded portion 621. In addition, a screw hole is formed in the V-phase second connection part 623a. The V-phase intermediate part 623b connects the V-phase second connection part 623a and the other end portion of the V-phase embedded portion 621 in the longitudinal direction of the V-phase embedded portion 621 and has an L shape in a plan view when seen from above. The V-phase intermediate part 623b connects the other end portion of the U-phase embedded portion 611 in the longitudinal direction of the U-phase embedded portion 611 on one end surface of the V-phase embedded portion 621 in the width direction of the V-phase embedded portion 621 (the upper end surface in FIG. 9B) and an end portion of the V-phase second connection part 623a.

The W-phase busbar 63 is formed by a belt-like W-phase embedded portion 631 having approximately the same width as that of the embedded portions 611 and 621 and embedded in the supporting plate 6b, a W-phase first connection portion 632 located at one end portion of the W-phase embedded portion 631 in the longitudinal direction of the W-phase embedded portion 631 and constituting an end connected to the corresponding elements Q in the corresponding wiring path, and a W-phase second connection portion 633 located at the other end portion of the W-phase embedded portion 631 in the longitudinal direction of the W-phase embedded portion 631 and constituting an end connected to the corresponding output terminal 8 in the corresponding wiring path.

The W-phase embedded portion 631 linearly extends in one direction. When embedded in the supporting plate 6b, the W-phase embedded portion 631 faces the other surface of the V-phase embedded portion 621 in the thickness direction of the thin plate member of the V-phase embedded portion 621 and extends in parallel to the V-phase embedded portion 621 and the U-phase first embedded portion 611a. In addition, the W-phase embedded portion 631 is longer than the V-phase embedded portion 621 in the longitudinal direction of the W-phase embedded portion 631.

The W-phase first connection portion 632 protrudes outwardly (upward in FIG. 9B) in the width direction from the one end portion of the W-phase embedded portion 631 in the longitudinal direction of the W-phase embedded portion 631 on one end surface of the W-phase embedded portion 631 in the width direction of the W-phase embedded portion 631 (the upper end surface in FIG. 9B). Specifically, the W-phase first connection portion 632 is formed by a long and thin W-phase first connection part 632a, which is an end directly connected to the corresponding elements Q, has an approximately prismatic cross section, and extends upward, and by a W-phase first base end part 632b which is connected to the W-phase embedded portion 631 and has approximately the same width as that of the W-phase embedded portion 631.

The W-phase second connection portion 633 has approximately the same width as that of the W-phase embedded portion 631. In addition, the W-phase second connection portion 633 is formed by a W-phase second connection part 633a and a W-phase intermediate part 633b and is located on the other end portion of the W-phase embedded portion 631 in the longitudinal direction of the W-phase embedded portion 631. The W-phase second connection part 633a constitutes an end directly connected to the corresponding output terminal 8 and has a surface that is parallel to and that faces an end surface of the other end portion of the W-phase embedded portion 631 in the longitudinal direction of the W-phase embedded portion 631. A screw hole is formed in the W-phase second connection part 633a. The W-phase intermediate part 633b connects the W-phase second connection part 633a and the other end portion of the W-phase embedded portion 631 in the longitudinal direction of the W-phase embedded portion 631 and has an approximately L shape in a plan view when seen from above. In addition, the W-phase intermediate part 633b connects the other end portion of the W-phase embedded portion 631 in the longitudinal direction of the W-phase embedded portion 631 on one end surface of the W-phase embedded portion 631 in the width direction of the W-phase embedded portion 631 (the upper end surface in FIG. 9B) and an end portion of the W-phase second connection part 633a.

When the busbars 6a (61, 62, and 63) formed as described above are integrated with the supporting plate 6b, the V-phase embedded portion 621 of the V-phase busbar 62 is located between the U-phase first embedded portion 611a of the U-phase busbar 61 and the W-phase embedded portion 631 of the W-phase busbar 63. In addition, when the busbars 6a (61, 62, and 63) are integrated with the supporting plate 6b, the U-phase second connection part 613a of the U-phase busbar 61, the V-phase second connection part 623a of the V-phase busbar 62, and the W-phase second connection part 633a of the W-phase busbar 63 are aligned, and the V-phase second connection portion 623 is located between the U-phase second connection portion 613 and the W-phase second connection portion 633 (see FIG. 9A). In the present example, the U-phase embedded portion 611, the V-phase embedded portion 621, and the W-phase embedded portion 631 each correspond to an "embedded portion" according to the present invention.

In addition, when the busbars 6a (61, 62, and 63) are integrated with the supporting plate 6b, the tip portion of the U-phase first connection part 612a of the U-phase busbar 61, the tip portion of the V-phase first connection part 622a of the V-phase busbar 62, and the tip portion of the W-phase first connection part 632a of the W-phase busbar 63 are located above the upper surface of the supporting plate 6b (that is, above the surface of the supporting plate 6b in the thickness direction of the supporting plate 6b, the surface being located in the direction of the control board 7) (see FIG. 8). In addition, the tip portion of the U-phase first connection part 612a, the tip portion of the V-phase first connection part 622a, and the tip portion of the W-phase first connection part 632a penetrate the control board 7 via through-holes formed in the control board 7 (see FIGS. 6 and 7) and are each electrically connected to a wiring pattern formed on the control board 7.

As illustrated in FIGS. 6 and 7, the sealed terminals 9 for the individual phases are integrally attached to the compartment wall portion 2e of the inverter housing 2b such that the sealed terminals 9 penetrate the compartment wall portion 2e. An end portion of each sealed terminal 9 in the second space S2 (on the inverter circuit portion 5 side) is connected to a corresponding output terminal 8 (see FIG. 3). A lead wire (not shown) electrically connects an end portion of each sealed terminal 9 in the first space S1 (on the motor 45 side) and a corresponding phase coil of the motor 4.

In addition, when the busbars 6a (61, 62, and 63) are integrated with the supporting plate 6b, the U-phase second connection part 613a of the U-phase busbar 61, the V-phase second connection part 623a of the V-phase busbar 62, and the W-phase second connection part 633a of the W-phase busbar 63 are exposed to the outside in the direction of the compartment wall portion 2e of the inverter housing 2b in a storage portion 6b2, which will be described below, of the supporting plate 6b (see FIG. 10) and are screwed to their respective output terminals 8 in the storage portion 6b2.

The orientation (posture) of the individual busbar 6a in the supporting plate 6b and the location of the individual busbar 6a in the supporting plate 6b in a plan view will be described in detail below.

As described above, the supporting plate 6b is formed by a resin member molded integrally with the busbars 6a and has a plate-like shape. In addition, the supporting plate 6b is disposed between the plurality of elements Q (Q1 to Q6) and the control board 7 and supports the control board 7 from below.

The supporting plate 6b is formed by a resin member and has a plate-like shape. In a plan view seen from above, the supporting plate 6b is formed to have a shape that can be stored in the inner region of the approximately arc-like first peripheral wall portion 2b1 (see FIG. 4). Although not particularly limited, the supporting plate 6*b* is formed by a first supporting plate portion 64 that is completely stored inside the first peripheral wall portion 2*b*1 and that occupies most of the supporting plate 6*b*, and by a second supporting plate portion 65 that is stored on the inner side of the border portion of the first peripheral wall portion 2*b*1 and the second peripheral wall portion 2*b*2. The first supporting plate portion 64 has a generally pentagonal baseball homebase plate shape in a plan view in outline. The second supporting plate portion 65 is molded integrally with the first supporting plate portion 64 such that the second supporting plate portion 65 protrudes from a side of the first supporting plate portion 64, the side being opposite to the acute angle portion of the homebase plate shape (see FIGS. 4, 8, and 10).

In the present example, cylindrical sleeves 66 are disposed at a plurality of portions at outer edge portions of the supporting plate 6*b*, the plurality of portions being located away from each other, such that the cylindrical sleeves 66 penetrate the supporting plate 6*b* in the thickness direction of the supporting plate 6*b*. A bolt 67 (see FIG. 5) for fixing the control board 7 to the wall surface 2*e*1 of the compartment wall portion 2*e* of the inverter housing 2*b* (the housing 2) is inserted into each sleeve 66. That is, the busbar assembly 6 (the inverter circuit portion 5) includes the busbars 6*a*, the sleeves 66, and the supporting plate 6*b*. In other words, the busbar assembly 6 is a product formed by the busbars 6*a*, the sleeves 66, and the supporting plate 6*b* that are integrated with each other by insert molding. Specifically, five sleeves 66 are formed in in the corner portions of the first supporting plate portion 64 and one sleeve 66 is formed in a corner portion of the second supporting plate portion 65. That is, a total of six sleeves 66 are formed in the busbar assembly 6.

In the present example, the supporting plate 6*b* includes a reinforcement rib 6*b*1 that extends to the center portion of the supporting plate 6*b* in a plan view from at least one of the plurality of portions (that is, the corner portions in which the sleeves 66 are formed) at the outer edge portions. The reinforcement rib 6*b*1 protrudes from one surface of the supporting plate 6*b* in the thickness direction of the supporting plate 6*b*. In the present example, the reinforcement rib 6*b*1 protrudes downward from the bottom surface of the supporting plate 6*b* (that is, the surface of the supporting plate 6*b* in the thickness direction of the supporting plate 6*b*, the surface being opposite to the control board 7). Specifically, as illustrated in FIG. 10, the reinforcement ribs 6*b*1 extend to the center portion of the supporting plate 6*b* in a plan view from four of the five corner portions of the first supporting plate portion 64, the four corner portions being other than the acute angle portion of the homebase plate shape.

In addition, as illustrated in FIG. 10, the storage portion 6*b*2 is formed on the bottom surface of the second supporting plate portion 65 of the supporting plate 6*b*. The U-phase second connection portion 613, the V-phase second connection portion 623, and the W-phase second connection portion 633 of the busbars 6*a* are mainly stored in the storage portion 6*b*2. This storage portion 6*b*2 is partitioned per phase and is open downward.

In addition, through-holes 6*b*3 are formed in locations (18 locations in FIG. 10) of the first supporting plate portion 64 of the supporting plate 6*b*, the locations corresponding to the terminals (the gate terminals G, the collector terminals C, and the emitter terminals E) of the elements Q (Q1 to Q6).

In addition, a portion from the acute angle portion of the homebase plate shape on the bottom surface of the supporting plate 6*b* to the second supporting plate portion 65 protrudes downward more than the reinforcement ribs 6*b*1 and constitutes a belt-like busbar embedment portion 6*b*4 that extends through approximately the center portion of the supporting plate 6*b* in a plan view. The portions on the bottom surface of the supporting plate 6*b* that are other than the outer edge portions, the portions corresponding to the sleeves 66, the reinforcement ribs 6*b*1, the storage portion 6*b*2, and the busbar embedment portion 6*b*4 are formed to be generally thin. The storage portion 6*b*2 and the busbar embedment portion 6*b*4 protrude downward more than the outer edge portions of the supporting plate 6*b* and the portions corresponding to the sleeves and are formed to be thick.

Next, the structure of the control board 7 will be described in detail.

The control board 7 is disposed above the elements Q (Q1 to Q6) such that the board surface of the control board 7 is parallel to the wall surface 2*e*1 of the compartment wall portion 2*e* in the second space S2. Various circuit elements such as the capacitor 51, the microcomputer unit, and the individual drive control elements are mounted on this control board 7. In addition, the control board 7 also includes wiring patterns functioning as wires other than the wiring paths constituted by the busbars 6*a* (61, 62, and 63) among the wiring paths illustrated in FIG. 2.

The control board 7 has through-holes at locations that match the through-holes of the sleeves 66 in the supporting plate 6*b*. In addition, boss portions 2*e*2 (see FIGS. 6 and 7) having screw holes (blind holes) are formed to protrude toward the control board 7 at the portions corresponding to the sleeves 66 of the wall surface 2*e*1 of the compartment wall portion 2*e* (In FIGS. 6 and 7, for clarity of illustration, some of the boss portions 2*e*2 are not shown). After the control board 7 and the supporting plate 6*b* of the busbar assembly 6 are disposed by aligning their respective through-holes, a bolt 67 is inserted into each through-hole. The control board 7 and the supporting plate 6*b* are attached to the wall surface 2*e*1 of the compartment wall portion 2*e* by being held between the head portions of the bolts and the boss portions 2*e*2 of the compartment wall portion 2*e*. That is, the upper surface of the portion corresponding to the individual sleeve 66 of the supporting plate 6*b* abuts the control board 7, and the bottom surface of the portion corresponding to the individual sleeve 66 of the supporting plate 6*b* abuts an end surface of the individual boss portion 2*e*2.

Next, the arrangement of the plurality of elements Q (Q1 to Q6) will be described.

In the present example, each of the plurality of elements Q (Q1 to Q6) is disposed in an area on the wall surface 2*e*1 of the compartment wall portion 2*e* (the housing 2), the area being other than an area (an area below the busbar embedment portion 6*b*4) corresponding to the busbars 6*a* (in other words, the busbar embedment portion 6*b*4) (see FIGS. 3 and 7). In addition, the plurality of elements Q (Q1 to Q6) are disposed on the wall surface 2*e*1 of the compartment wall portion 2*e* such that the elements (Q1, Q3, and Q5) as the power-supply-side elements face the elements (Q2, Q4, and Q6) as the ground-side elements and such that terminal portions T, where the individual terminals (G, C, and E) protrude, of one pair of elements Q of the same phase face each other (see FIG. 3). An insulating sheet 10 is formed between the bottom surface of each of the elements Q (Q1 to Q6) and the wall surface 2*e*1 of the compartment wall portion 2*e* (see FIGS. 3, 6, and 7). Each of the elements Q (Q1 to Q6) is firmly attached to the wall surface 2*e*1 of the compartment wall portion 2*e* by a bolt 68 via the insulating sheet 10. Although not particularly limited, as illustrated in FIGS. 6 and 7, the portion of the wall surface 2e1 to which the plurality of elements Q (specifically, the insulating sheet 10) are attached is protruded somewhat upward compared with the other portions. In this state, a gap is formed between the upper surface of each of the plurality of elements Q and the bottom surface of the thin portion of the supporting plate 6b.

In addition, each of the elements Q (Q1 to Q6) is shaped in an approximately rectangular plate. After the terminals (G, C, and E) of each of the elements Q (Q1 to Q6) protrude from one side portion (the terminal portion T) of the corresponding element Q (Q1 to Q6), the terminals (G, C, and E) bend upward (toward the control board 7). The tip portions of the terminals (G, C, and E) protrude upward above the upper surface of the control board 7 via the through-holes 6b3 of the supporting plate 6b and the through-holes formed in the control board 7 and are each electrically connected to a wiring pattern formed on the control board 7.

Figure 11:
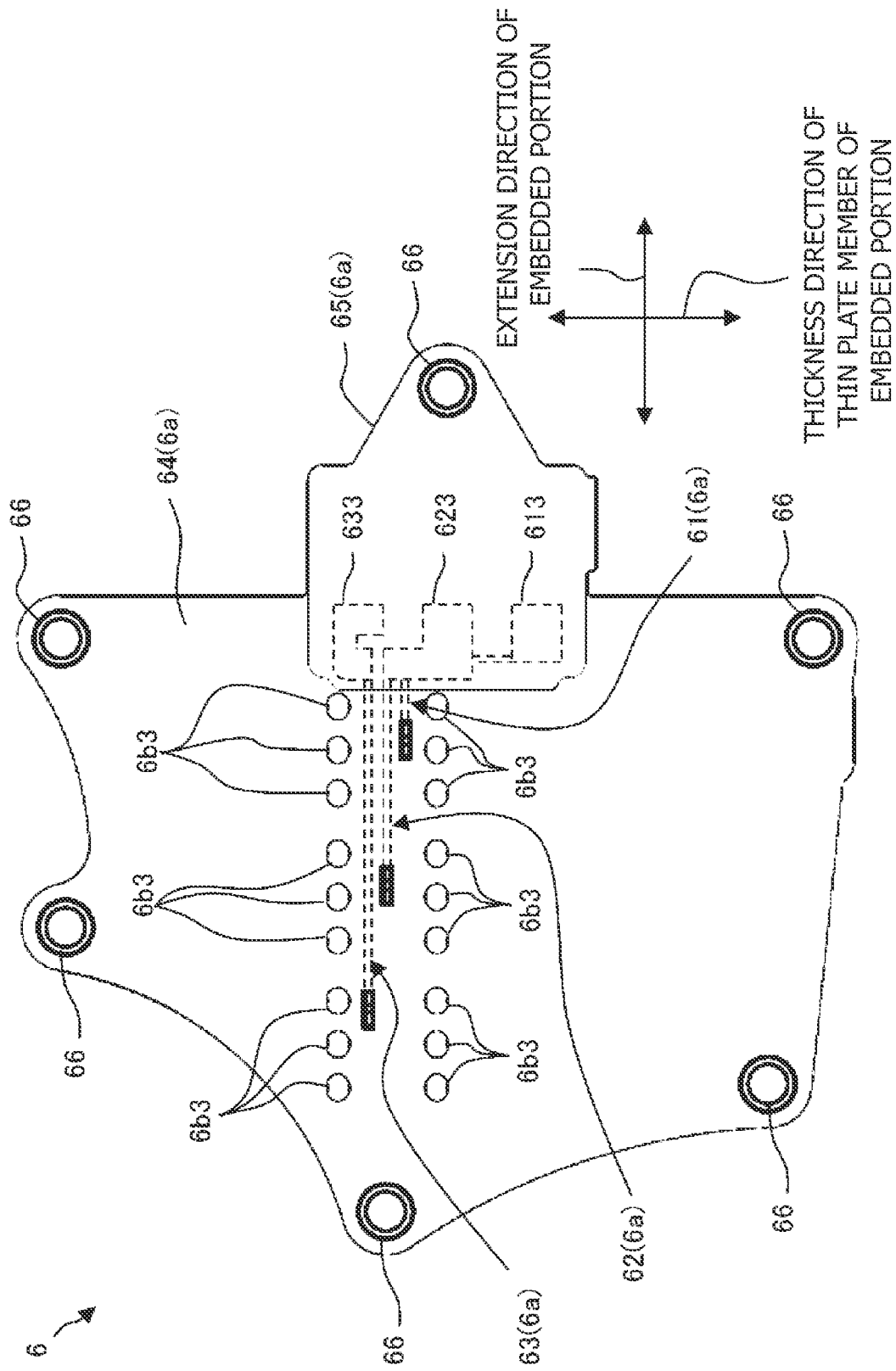
FIG. 11 is a top view of the busbar assembly.

Next, the orientation (posture) of the busbars 6a in the supporting plate 6b and the location of the busbars 6a in the supporting plate 6b in a plan view will be described in detail. FIG. 11 is a top view of the busbar assembly 6, and FIG. 12 is a conceptual diagram illustrating the embedded state (orientation) of the plurality of busbars 6a. The embedded busbars 6a are indicated by dotted lines in FIG. 11, and the supporting plate 6b is indicated by a dotted line in FIG. 12.

As illustrated in FIGS. 11 and 12, in the supporting plate 6b, the embedded portions (the U-phase embedded portion 611, the V-phase embedded portion 621, and the W-phase embedded portion 631) of the busbars 6a extend in a direction perpendicular to the thickness direction of the supporting plate 6b, and the thickness direction of the thin plates of the embedded portions (the U-phase embedded portion 611, the V-phase embedded portion 621, and the W-phase embedded portion 631) is perpendicular to the thickness direction of the supporting plate 6b. The term "perpendicular" may mean approximately (about) 90° ("perpendicular" does not necessarily mean exactly 90°). For example, up to a manufacturing error of about 10° is allowed based on the positioning accuracy, etc., inside the mold of the busbars 6a in insert molding, and therefore, the above term "perpendicular" may mean approximately 90°.

In other words, the individual belt-like embedded portions (611, 621, and 631) are embedded in the supporting plate 6b such that one end surface of each of the embedded portions (611, 621, and 631) in the width direction of the belt of each of the belt-like embedded portions (611, 621, and 631) is parallel (or approximately parallel) to the top and bottom surfaces of the supporting plate 6b of the busbar assembly 6, the board surface of the control board 7, and the wall surface 2e1 of the compartment wall portion 2e of the inverter housing 2b. In addition, in other words, the individual thin-plate embedded portions (611, 621, and 631) are embedded in the supporting plate 6b such that one side surface of each of the embedded portions (611, 621, and 631) in the thickness direction of the embedded portions (611, 621, and 631) is perpendicular (approximately perpendicular) to the top and bottom surfaces of the supporting plate 6b of the busbar assembly 6, the board surface of the control board 7, and the wall surface 2e1 of the compartment wall portion 2e of the inverter housing 2b. In addition, the busbars 6a (61, 62, and 63) are close to and side by side with each other, and most of the busbars 6a (61, 62, and 63) are embedded in the supporting plate 6b.

Since, in this way, the embedded portions (611, 621, and 631) of the busbars 6a are embedded in the supporting plate 6b, the thickness direction of the supporting plate 6b (in other words, the control board 7), which is the direction in which the supporting plate 6b and the control board 7 easily warp, matches the width direction of the thin plates of the embedded portions (611, 621, and 631) embedded in the supporting plate 6b. As a result, a sufficient size in the height direction of the embedded portions (611, 621, and 631) in the supporting plate 6b (the thickness direction of the supporting plate 6b) can be ensured, and the embedded portions (611, 621, and 631) of the busbars 6a can improve the stiffness of the supporting plate 6b molded integrally with the busbars 6a.

In the present example, the W-phase embedded portion 631 of the W-phase busbar 63 of the plurality of busbars 6a extends in the supporting plate 6b through approximately the center portion of the supporting plate 6b in a plan view in the busbar embedment portion 6b4 of the supporting plate 6b. That is, the W-phase embedded portion 631 of the W-phase busbar 63 is disposed over almost the entire busbar embedment portion 6b4, which is formed to be thicker than the other portions, in the longitudinal direction of the busbar embedment portion 6b4, and this W-phase embedded portion 631 can function as a frame member that effectively reinforces the easily warped center portion of the supporting plate 6b.

In addition, in the present example, the embedded portions (611, 621, and 631) of the busbars 6a are disposed above a belt-like area S (an area indicated by a long dashed double-dotted line in FIG. 3) between the elements (Q1, Q3, and Q5) as the power-supply-side elements of the plurality of elements Q (Q1 to Q6) and the elements (Q2, Q4, and Q6) as the ground-side elements of the plurality of elements Q (Q1 to Q6) (see FIG. 7). In other words, the belt-like area S between the power-supply-side elements (Q1, Q3, and Q5) and the ground-side elements (Q2, Q4, and Q6) is disposed below the busbar embedment portion 6b4, which can be formed to be thick, of the supporting plate 6b.

In the electric compressor 1 according to the example, the embedded portions (611, 621, and 631) of the busbars 6a formed by thin plate members made of metal extend in a direction perpendicular to the thickness direction of the supporting plate 6b, and the thickness direction of the thin plates of the embedded portions (611, 621, and 631) is perpendicular to the thickness direction of the supporting plate 6b. In addition, the embedded portions (611, 621, and 631), which are part of the busbars 6a, are also part of the wiring of the inverter circuit portion 5. By disposing the embedded portions (611, 621, and 631) in the supporting plate 6b as described above, that is, by using the embedded portions (611, 621, 631), which are part of the wiring of the inverter circuit portion 5, the stiffness of the supporting plate 6b can be improved. As a result, without increasing the number of components, the stiffness necessary for the stacked structure including the supporting plate 6b and the control board 7 can be ensured.

As described above, it is possible to provide the electric compressor 1 having the stiffness necessary for the stacked structure including the supporting plate 6b and the control board 7, without increasing the number of components.

In addition, when the thickness of the supporting plate 6b is approximately the same as a convention thickness, because of the embedded portions (611, 621, and 631) of the busbars 6a, the stiffness of the main supporting structure of the supporting plate 6b (consequently, the inverter circuit portion 5) can be improved more than conventionally. As a result, the electric compressor 1 having the inverter circuit portion 5 having excellent vibration resistance can be provided.

In the present example, the W-phase embedded portion 631 of the W-phase busbar 63 extends through approximately the center portion of the supporting plate 6b in the supporting plate 6b. In this way, this part of the busbars 6a reinforces the easily warped center portion of the supporting plate 6b more effectively.

In the present example, the supporting plate 6b has a reinforcement rib 6b1 that extends from at least one of the plurality of portions at the outer edge portions, the plurality of portions being located away from each other, to approximately the center portion of the supporting plate 6b in a plan view and that protrudes from one surface of the supporting plate 6b in the thickness direction of the supporting plate 6b. In this way, the stiffness of the supporting plate 6b in the thickness direction is improved more effectively. In the present example, with the busbar embedment portion 6b4, four reinforcement ribs 6b1 function as frame members extending radially outwardly from the center portion of the supporting plate 6b on the lower surface of the supporting plate 6b.

In the present example, the plurality of elements Q (Q1 to Q6) are each disposed in an area on the wall surface 2e1 of the compartment wall portion 2e (the housing 2), the area being other than an area (an area below the busbar embedment portion 6b4) corresponding to the busbars 6a (the busbar embedment portion 6b4). That is, the elements Q can be disposed in an area on the wall surface 2e1, the area being other than an area below the busbar embedment portion 6b4, which can be formed to be thick, of the supporting plate 6b. In other words, the elements Q can be disposed in an area below the relatively thin portion of the supporting plate 6b on the wall surface 2e1. In this way, the overall size of the stacked portion of the elements Q and the supporting plate 6b of the inverter circuit portion 5 in the height direction (the thickness direction) can be reduced easily, whereby reduction in size of the inverter housing 2b (the electric compressor 1) can be consequently achieved.

In the present example, regarding the plurality of elements Q, the power-supply-side elements (Q1, Q3, and Q5) face the ground-side elements (Q2, Q4, and Q6), and the terminal portions T of one pair of elements Q of the same phase face each other. In this state, the plurality of elements Q are disposed on the wall surface 2e1 of the compartment wall portion 2e. In this way, the wiring distance among the plurality of elements Q can be shortened.

In the present example, the embedded portions (611, 621, and 631) of the busbars 6a are disposed above the belt-like area S between the power-supply-side elements (Q1, Q3, and Q5) and the ground-side elements (Q2, Q4, and Q6). Thus, the thick busbar embedment portion 6b4 is disposed between the power-supply-side elements (Q1, Q3, and Q5) and the ground-side elements (Q2, Q4, and Q6) in a plan view of the wall surface 2e1, and the plurality of elements Q can be disposed close to the busbars 6a (the busbar embedment portion 6b4) in the plan view. As a result, because the planar area (footprint area) occupied by the elements Q and the busbars 6a can be effectively reduced, downsizing of the inverter housing 2b (the electric compressor 1) can be achieved more effectively. In addition, because an end portion of the busbar embedment portion 6b4, the end portion being located in the direction of the wall surface 2e1, can be located between the power-supply-side elements (Q1, Q3, and Q5) and the ground-side elements (Q2, Q4, and Q6), the overall size of the stacked portion of the elements Q and the supporting plate 6b of the inverter circuit portion 5 in the height direction (the thickness direction) can be reduced more effectively.

In the present example, each busbar 6a constitutes part of the wiring between an intermediate point of the wiring connecting one pair of elements Q of the same phase ((Q1 and Q2), (Q3 and Q4), or (Q5 and Q6)) and the motor 4. However, the present invention is not limited to this example. For example, each of the busbars 6a may constitute part of the wiring between a positive-side input terminal (power supply terminal) of the DC power supply (not shown) and one of the power-supply-side elements (Q1, Q3, and Q5) or may constitute part of the wiring between a ground terminal (not shown) and one of the ground-side elements (Q2, Q4, and Q6), for example. Although the busbar assembly 6 (the inverter circuit portion 5) includes three busbars 6a in the present example, four or more busbars 6a or two busbars 6a may alternatively be used. Alternatively, the busbar assembly 6 may include only one busbar 6a.

In the present example, only the W-phase embedded portion 631 extends through approximately the center portion of the supporting plate 6b in the supporting plate 6b. However, the present invention is not limited to this example. In the same way as the W-phase busbar 63, the V-phase busbar 62 and the U-phase busbar 61 of the plurality of busbars 6a may also be formed to extend from the second supporting plate portion 65 toward the acute angle corner portion of the first supporting plate portion 64 shaped in a homebase plate through the center portion of the supporting plate 6b. In this way, the center portion of the supporting plate 6b is reinforced more effectively.

Although an example of the present invention and variations thereof have thus been described, the present invention is not limited to the above example and variations. Further variations and modifications can of course be made based on the basic technical concepts of the present invention.

REFERENCE SYMBOL LIST 1 electric compressor
2 housing
2e1 wall surface
4 motor
inverter circuit portion
6a busbar
61 U-phase busbar (busbar)
611 U-phase embedded portion (embedded portion)
62 V-phase busbar (busbar)
621 V-phase embedded portion (embedded portion)
63 W-phase busbar (busbar)
631 W-phase embedded portion (embedded portion)
6b supporting plate
6b1 reinforcement rib
66 sleeve
67 bolt
7 control board
Q element (power switching element)
Q1, Q3, Q5 power-supply-side element
Q2, Q4, Q6 ground-side element
Q1, Q2 a pair of elements of the same phase (power switching element)
Q3, Q4 a pair of elements of the same phase (power switching element)
Q5, Q6 a pair of elements of the same phase (power switching element)
S belt-like area
T terminal portion

The invention claimed is:

1. An electric compressor comprising:
an inverter circuit portion having a plurality of power switching elements and a control board disposed above the plurality of power switching elements,
wherein the inverter circuit portion includes a busbar that is formed by a thin plate member made of metal and that constitutes part of a wiring of the inverter circuit portion, and includes a plate-like supporting plate that is formed by a resin member molded integrally with the busbar, that is disposed between the plurality of power switching elements and the control board, and that supports the control board from below, and
wherein the busbar has an embedded portion that is embedded in the supporting plate, and extends in a direction perpendicular to a thickness direction of the supporting plate, and a thickness direction of the thin plate member of the embedded portion is perpendicular to the thickness direction of the supporting plate.

2. The electric compressor according to claim 1,
wherein the inverter circuit portion includes the busbar in plurality, and
wherein the embedded portion of at least one of the plurality of busbars extends through a center portion of the supporting plate in the supporting plate.

3. The electric compressor according to claim 2, further comprising a housing having a wall surface to which the inverter circuit portion is attached,
wherein the inverter circuit portion includes sleeves disposed at a plurality of portions at outer edge portions of the supporting plate, the plurality of portions being located away from each other, and bolts for fixing the control board to the wall surface of the housing are inserted into the sleeves, and
wherein the supporting plate includes a reinforcement rib that extends to the center portion of the supporting plate from at least one of the plurality of portions at the outer edge portions, and the reinforcement rib protrudes from one surface of the supporting plate in the thickness direction of the supporting plate.

4. The electric compressor according to claim 2,
wherein power-supply-side elements of the plurality of power switching elements face ground-side elements of the plurality of power switching elements, and the plurality of power switching elements are disposed on the wall surface such that terminal portions of one pair of power switching elements of a same phase face each other, and
wherein the individual busbar constitutes part of a wiring between an intermediate point of a wiring connecting the corresponding pair of power switching elements and a motor to which power is supplied.

5. The electric compressor according to claim 1, further comprising a housing having a wall surface to which the inverter circuit portion is attached,
wherein the inverter circuit portion includes sleeves disposed at a plurality of portions at outer edge portions of the supporting plate, the plurality of portions being located away from each other, and bolts for fixing the control board to the wall surface of the housing are inserted into the sleeves, and
wherein the supporting plate includes a reinforcement rib that extends to the center portion of the supporting plate from at least one of the plurality of portions at the outer edge portions, and the reinforcement rib protrudes from one surface of the supporting plate in the thickness direction of the supporting plate.

6. The electric compressor according to claim 5, wherein the plurality of power switching elements are each disposed in an area on the wall surface of the housing, the area being other than an area where the individual busbar is located.

7. The electric compressor according to claim 6,
wherein power-supply-side elements of the plurality of power switching elements face ground-side elements of the plurality of power switching elements, and the plurality of power switching elements are disposed on the wall surface such that terminal portions of one pair of power switching elements of a same phase face each other, and
wherein the individual busbar constitutes part of a wiring between an intermediate point of a wiring connecting the corresponding pair of power switching elements and a motor to which power is supplied.

8. The electric compressor according to claim 5,
wherein power-supply-side elements of the plurality of power switching elements face ground-side elements of the plurality of power switching elements, and the plurality of power switching elements are disposed on the wall surface such that terminal portions of one pair of power switching elements of a same phase face each other, and
wherein the individual busbar constitutes part of a wiring between an intermediate point of a wiring connecting the corresponding pair of power switching elements and a motor to which power is supplied.

9. The electric compressor according to claim 1,
wherein power-supply-side elements of the plurality of power switching elements face ground-side elements of the plurality of power switching elements, and the plurality of power switching elements are disposed on the wall surface such that terminal portions of one pair of power switching elements of a same phase face each other, and
wherein the individual busbar constitutes part of a wiring between an intermediate point of a wiring connecting the corresponding pair of power switching elements and a motor to which power is supplied.

10. The electric compressor according to claim 9, wherein the embedded portion of the individual busbar is disposed above a belt-like area between the power-supply-side elements of the plurality of power switching elements and the ground-side elements of the plurality of power switching elements.

* * * * *